Aug. 23, 1932.   R. K. LEE   1,872,767
MOTOR MOUNTING
Filed Feb. 24, 1930
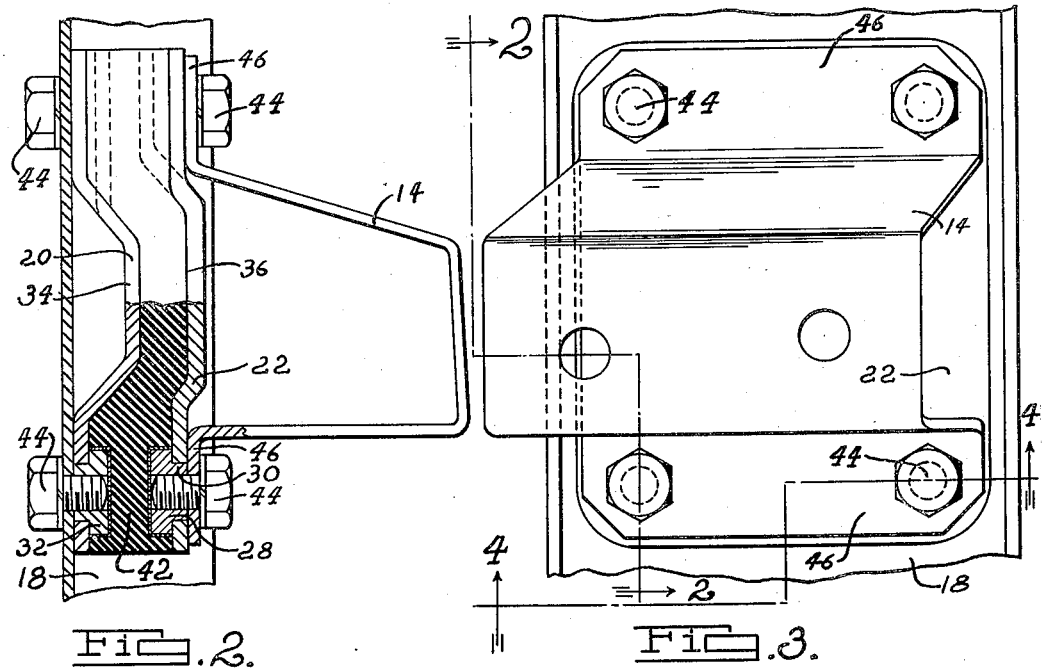
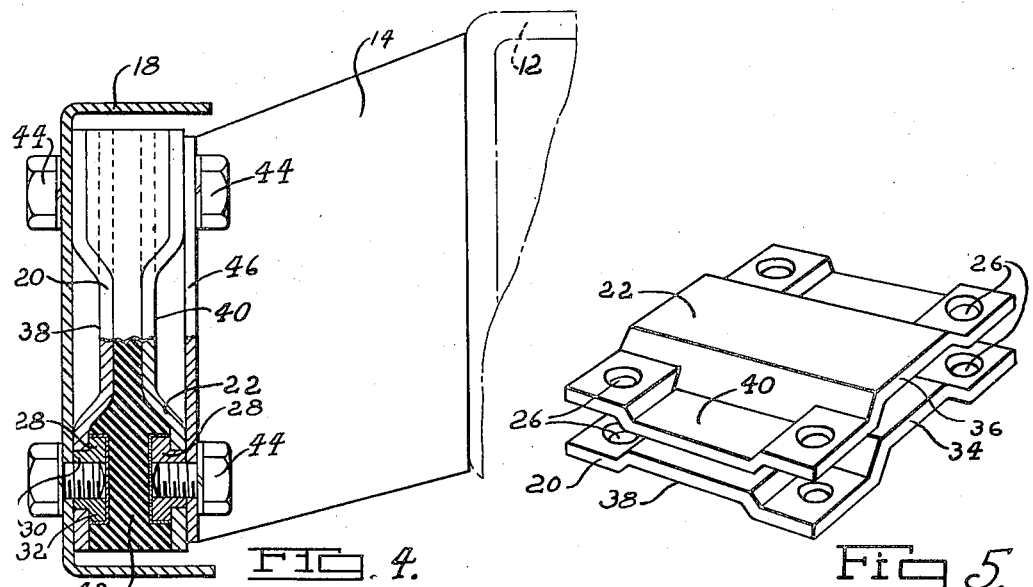
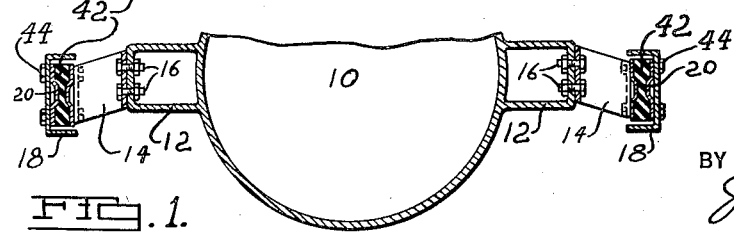
INVENTOR
ROGER K. LEE
BY
ATTORNEY Patented Aug. 23, 1932

1,872,767

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

MOTOR MOUNTING

Application filed February 24, 1930. Serial No. 430,634.

This invention relates to a resilient mounting and more particularly to a mounting adapted to dampen out vibrations between a supporting member and a member to be supported such as an internal combustion engine and a chassis frame.

An object of the invention is to provide a mounting of elastic material having a given rate of deflection in one direction and a different rate of deflection in another direction.

Another object of the invention is to provide a thin flat resilient mounting having internally screw threaded portions by which the mounting may be secured to a support and a member to be supported.

Other objects and advantages of the invention will more fully appear from the following description taken in connection with the accompanying drawing, in which:

Fig. 1 is a sectional view showing a portion of an internal combustion engine supported between the side members of a chassis frame illustrating a preferred embodiment of my invention.

Fig. 2 is a view taken on line 2—2 of Fig. 3, partly in section and partly in elevation.

Fig. 3 is a side elevation of Fig. 2.

Fig. 4 is a view taken on line 4—4 of Fig. 3, partly in section and partly in elevation.

Fig. 5 is a perspective view of a preferred embodiment of my mounting.

Referring to the drawing, an internal combustion engine has been shown at 10 having laterally projecting arms 12 to which are secured downwardly extending channel members 14 by bolts 16. Side frame members 18 have been illustrated as the frame members of an automobile chassis adapted to form the support for the engine 10.

The mounting which forms a connection between one side frame member and the channel shaped member 14 is provided with two plate like members, one member 20 adapted to be secured to a support such as the frame member 18 and the other member 22 adapted to be secured to a part to be supported, such as the engine 10 through the channel 14. The members 20 and 22 are preferably rectangular in shape and are formed from stamped plates having openings 26 in the four corners of each member. Internally screw threaded members 28 have a portion 30 which is received in the openings 26, and a head portion 32 of the screw threaded member 28 which is received against the inner face of the plate like members 20 and 22.

Referring to Fig. 2, it will be seen that vertical channels 34 and 36 have been formed, one in each of the plate like members 20 and 22, extending in the same direction. Referring to Fig. 4, it will be seen that smaller channels 38 and 40 have been provided in the members 20 and 22 extending toward each other. These channels 38 and 40 extend at right angles to the channels 34 and 36. A resilient member 42, preferably rubber, has its opposite faces vulcanized to the adjacent faces of the plate like members 20 and 22 covering the head 32 of the screw threaded members 28. Bolts 44 extend through the frame 18 and flanges 46 of the channel 14 to secure the mounting to a support and to a member adapted to be supported.

It will be understood that I have provided a construction in which the part to be supported has a given rate of deflection in a direction at right angles to the plane of the plates and that the rate of deflection, in a direction at right angles to the plane of the plate is reduced. When the mounting is secured between the side frame member of an automobile chassis and an internal combustion engine, the engine has a definite rate of deflection in a vertical direction and is restricted against lateral deflection.

By providing internally screw threaded members in the form of nuts supported on the inner faces of the plate like members, the plate like members may be formed from thin flat plates having a long screw threaded surface for the securing means which holds the mounting to a support and a part to be supported.

Various changes including the size, shape and arrangement of parts may be made without departing from the spirit of my invention and it is my intention to cover by the appended claims such changes as may be reasonably included within the scope of my invention.

I claim:

1. A mounting of the class described comprising, two spaced plate like members arranged in overlapping relation with each other, central depressed portions, one on each member extending inwardly toward each other, securing means on said plate like members, spaced from said depressed portion and rubber between and bonded to the adjacent faces of said plate like members.

2. A mounting of the class described comprising, two plate like members arranged in overlapping relation with each other, central depressed portions one on each member extending inwardly toward each other, screw threaded members received in openings in the plate members beyond the depressed portions, heads on said screw threaded members in engagement with the inner surfaces of said plate like members, and rubber between and bonded to the inner faces of said plate like members.

3. A mounting of the class described comprising, two spaced plate like members arranged in overlapping relation with each other, central depressed means in one or more of said plates extending toward the other plate to form a relatively thin space between said members adjacent their center, and rubber between and vulcanized to the adjacent faces of said plate like members.

4. A mounting of the class described comprising, two spaced plate like members arranged in overlapping relation with each other, inwardly extending portions at the center of said plates arranged and formed to vary the space between said plates, and rubber between and vulcanized to the adjacent faces of said plates, said rubber varying in thickness.

5. A mounting of the class described comprising, a member adapted to be secured to a support, a member having depressions therein in spaced overlapping relation with the first named plate adapted to be secured to a part to be supported, and rubber vulcanized to adjacent faces of said members, said rubber varying in thickness in planes at right angles to the direction of the force exerted on the mounting.

6. A mounting of the class described comprising, a member adapted to be secured to a support, a member adapted to be secured to a part to be supported, a rubber between said members and vulcanized to the adjacent faces thereof, and a depressed portion on each of said members extending in the same direction and directly opposite each other, the depression on one of said members being greater than the depression on the other of said members.

7. A mounting of the class described comprising, a member adapted to be secured to a support, a member spaced from and in overlapping relation with the other member adapted to be secured to a part to be supported, a depression on one of said members, a projection of a different dimension than the dimension of said depression on the other of said members opposite the depression in overlapping relation, and rubber vulcanized to the adjacent faces of said members and between the projection and the depression.

8. A mounting of the class described, comprising, two spaced plate-like members arranged in overlapping relation with each other, depressed portions in the plates arranged to form a varying space between said plates, and rubber vulcanized to the adjacent faces of said plate-like members.

ROGER K. LEE.